United States Patent [19]

Merritt

[11] Patent Number: 4,549,633

[45] Date of Patent: Oct. 29, 1985

[54] TREE CLIMBING APPARATUS

[76] Inventor: Horace L. Merritt, Rte. 1, Box 24, Cotton Valley, La. 71078

[21] Appl. No.: 664,546

[22] Filed: Oct. 25, 1984

[51] Int. Cl.$^4$ .......................................... A01M 31/02
[52] U.S. Cl. ................................. 182/135; 182/187
[58] Field of Search ............. 182/187, 188, 116, 135, 182/134; 108/152

[56] References Cited

U.S. PATENT DOCUMENTS

| | | | |
|---|---|---|---|
| 3,338,332 | 8/1967 | Brantly | 182/187 |
| 3,396,818 | 8/1968 | Moragne | 182/187 |
| 3,856,111 | 12/1974 | Baker | 182/187 |
| 3,944,022 | 3/1976 | Ming | 182/187 |
| 4,137,995 | 2/1976 | Fonte | 182/187 |
| 4,168,765 | 9/1979 | Ferguson | 182/187 |
| 4,331,216 | 5/1982 | Amacker | 182/187 |
| 4,417,645 | 11/1983 | Untz | 182/187 |
| 4,488,620 | 12/1984 | Gibson | 182/187 |

OTHER PUBLICATIONS

"The Rifleman" 11/1973.

Primary Examiner—Reinaldo P. Machado
Attorney, Agent, or Firm—John M. Harrison

[57] ABSTRACT

A tree climbing apparatus which includes a climbing platform characterized by a platform yoke provided with a seat for supporting a hunter and a folding foot support which includes a foot support yoke and a cooperating foot platform for intermittant support of the hunter while the climbing platform is caused to ascend a tree engaged by the platform yoke and foot support yoke. Both the platform yoke and the foot support yoke feature a Y-shaped segment and a removable blade for engaging the tree on opposite sides to support the platform yoke at a first selected elevation and the foot support yoke and companion foot platform at a second selected elevation beneath the platform yoke.

20 Claims, 12 Drawing Figures

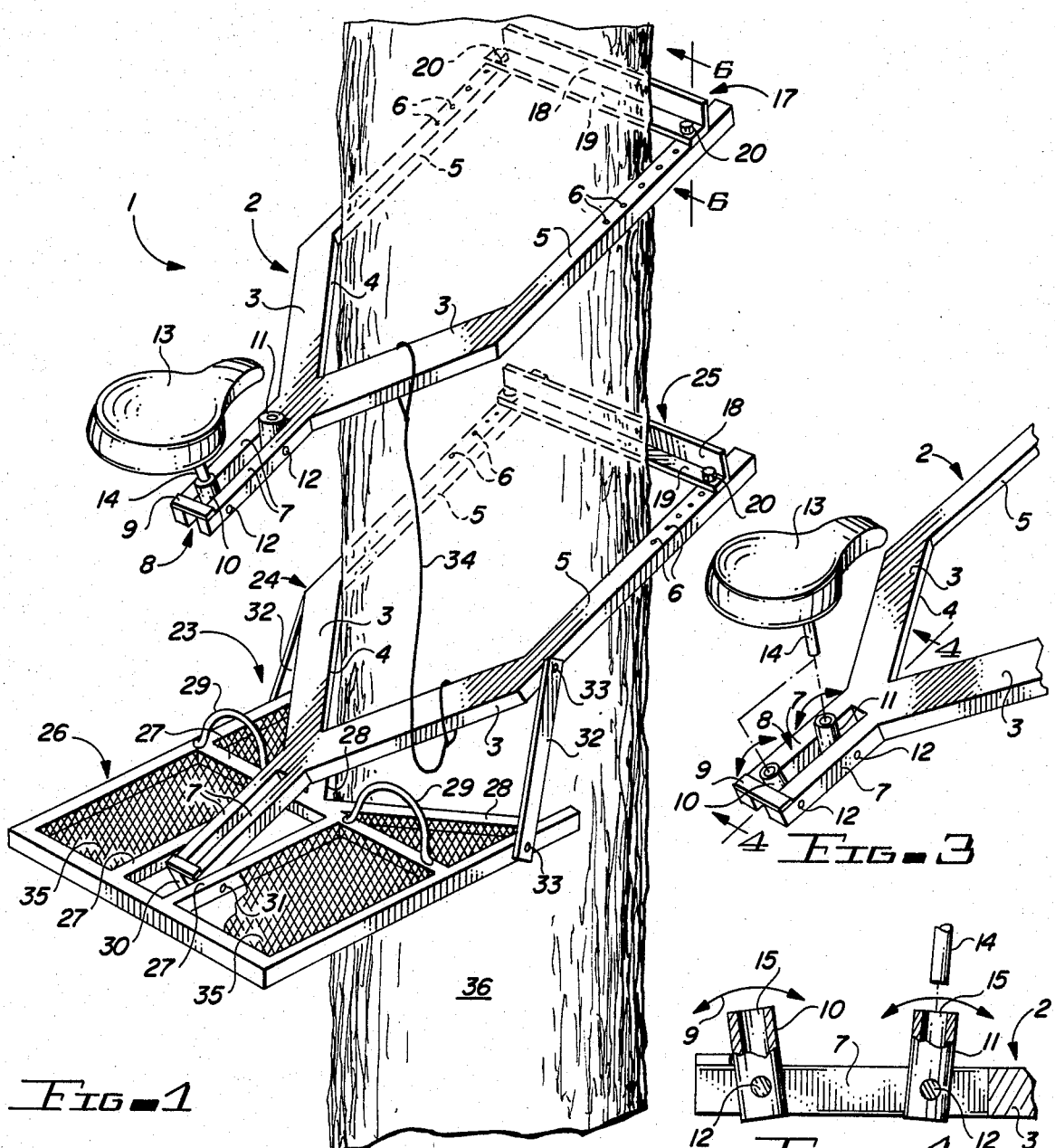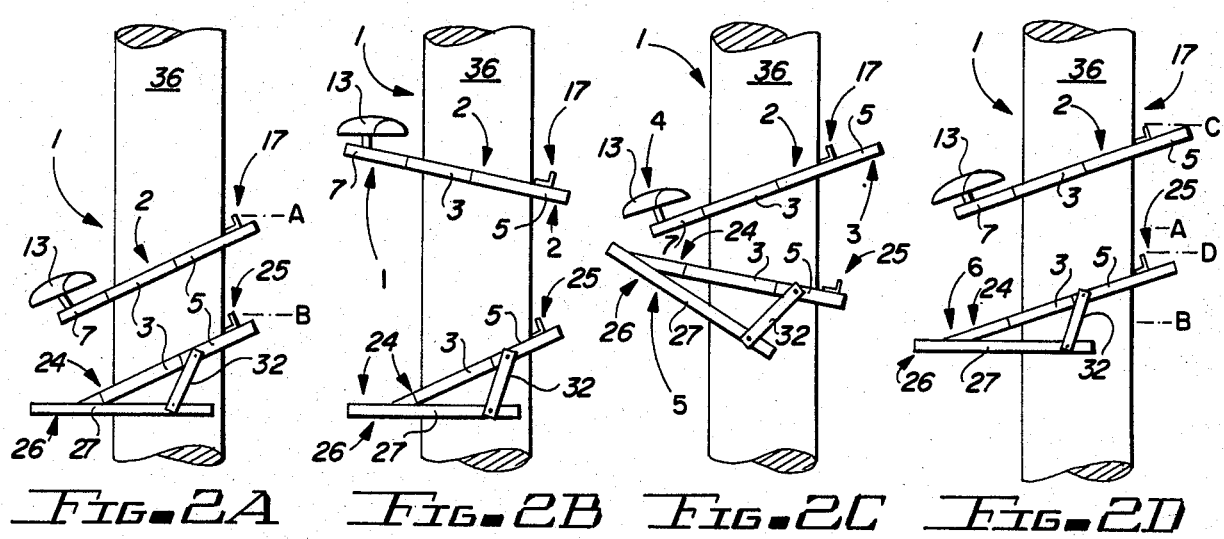

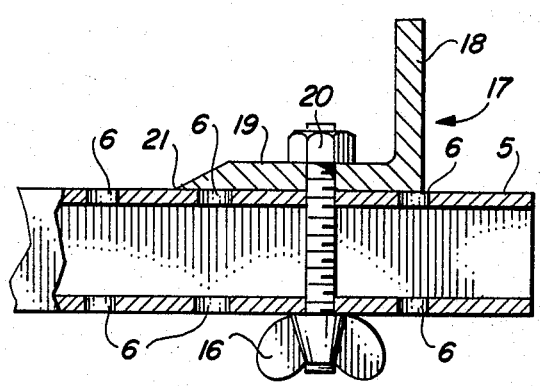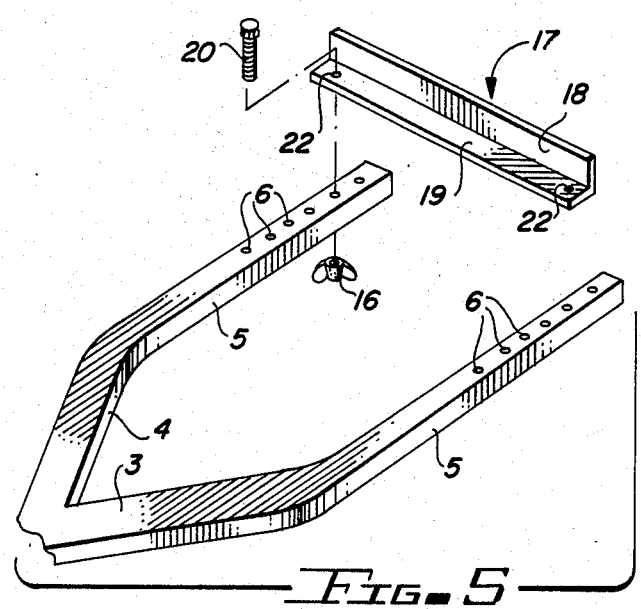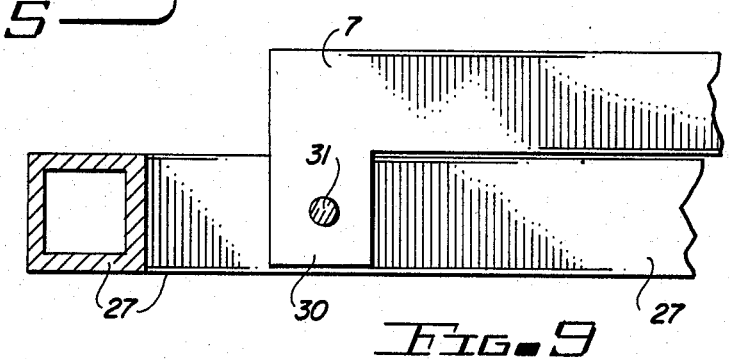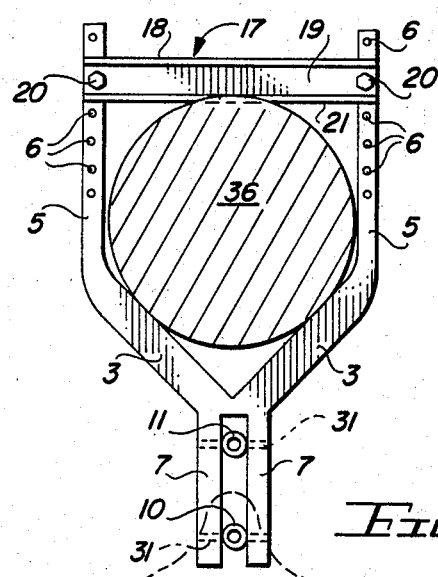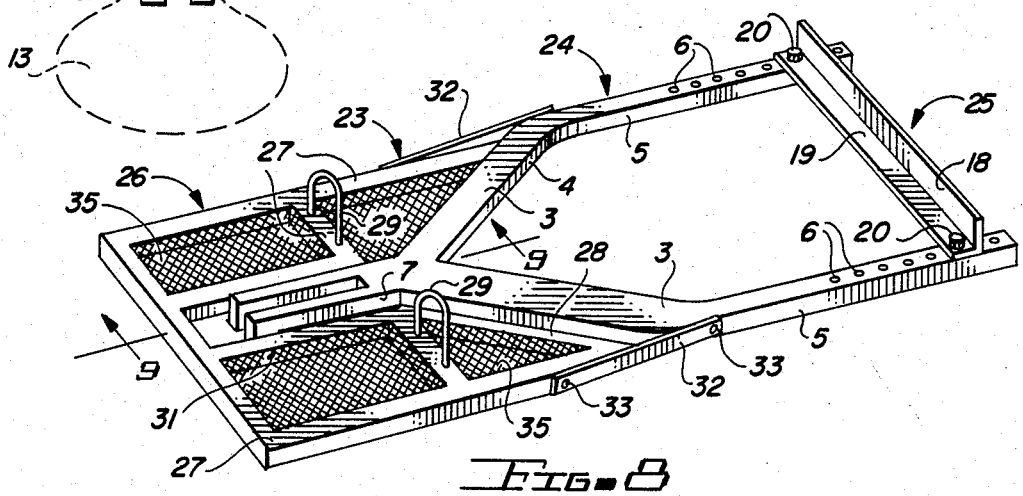

TREE CLIMBING APPARATUS

BACKGROUND OF THE INVENTION

1. Field of the Invention

This invention relates to an apparatus for ascending and descending trees, utility poles and other vertically oriented posts, and more particularly, to a tree climbing apparatus characterized by a portable tree climbing platform and a cooperating foot support, both of which are positioned circumferentially on a tree or pole with the climbing platform located above the foot support and the user alternately standing on the foot support and lifting the climbing platform, and then leaning on the climbing apparatus to lift the foot support, in order to work his way up the tree or pole. Both the climbing platform and the foot support are fitted with removable tree engaging members, or blades, for engagement and disengagement with the tree or pole in order to provide adjustment for the size of the tree or pole and to facilitate ease of manipulation. In a preferred embodiment of the invention, the foot support is connected to the climbing platform by a safety strap or line in order to facilitate retrieval of the foot support should it inadvertently slip from engagement with the user's feet while climbing and descending. The climbing platform and foot support of this invention are light in weight and easy to manipulate, and the foot support can be folded for additional ease in transportation, as well as positioned in backpack fashion on the user's shoulders.

2. Description of the Prior Art

Various tree and pole climbing apparatus, and climbing deer stands and gun platforms, in particular, are known in the prior art. Typical of these platforms is the apparatus known as "The Rifleman" which is advertised in *Bow and Arrow* magazine in a feature known as the "Bow Hunter's Annual" on June 9, 1977, at page 66. This apparatus utilizes a climbing means and a cooperating foot support which appear to be light in weight and fairly easy to manipulate. Also typical of climbing apparatus known in the prior art is the hand climber for use with a tree climbing platform, as disclosed in U.S. Pat. No. 4,168,765 to Clarence E. Ferguson, et al. This climbing appartus includes a hand climber which is attached to a tree or pole at a point above the user and is used in cooperation with a support platform carried by the user's feet, with the user pulling himself and the support platform up the tree or pole while grasping the hand climber, and subsequently supporting himself on the support platform while manipulating the hand climber higher up the tree or pole. A similar pole climbing apparatus is illustrated in U.S. Pat. No. 4,137,995 to Frank Fonte, which apparatus includes a pair of platforms, one of which supports the feet of a user and the other positioned essentially about the waist of the user, both of which platforms engage the tree or pole to be climbed. The upper platform is initially used to support the weight of the user, and the lower platform is pulled upwardly while the user's weight is supported by the lower platform, to facilitate a means for moving up and down the pole or tree. Yet another climbing apparatus is illustrated in U.S. Pat. No. 3,944,022 to Joseph W. Ming. The Ming tree climbing stand is built of rigid sheet material and includes a pair of tubular runners secured to either side of the stand and having a tree-contacting end fitted with a V-notch in the center. As in the case of the Ferguson stand, this climbing platform is fitted with a means for inserting the feet, and climbing is accomplished by grasping the tree, pulling the platform upwardly with the legs, and subsequently using the platform to support the legs while the user facilitates another grip higher up the tree. Descent is accomplished by reversing this climbing procedure. Yet another climbing platform is illustrated in U.S. Pat. No. 3,338,332 to H. W. Brantly. The deer stand of this invention includes a U-shaped bracing element constructed in such a manner as to have a concave inner surface rest against the front of a tree; a clamping bar which can be connected to the legs of the U-shaped bracing element at the rear of the tree; a platform supported by the U-shaped bracing element and clamping bar; and braces extending downwardly at an angle from the platform, which braces engage the trunk of the tree at a point below the U-shaped bracing element.

Many of the prior art climbing platforms, and portable climbing stands in particular, suffer from the disability of being relatively complicated and sometimes heavy, which are severe disadvantages to a hunter, who must depend upon mobility in order to assure access to the areas frequented by wild game such as deer. Furthermore, some of the prior art devices, while light in weight, are not structurally sound and are not sufficiently large for relative positioning of the hunter, and many do not include sufficient safety features which are necessary for the average hunter.

Accordingly, it is an object of this invention to provide a new and improved climbing apparatus and cooperating foot support which are characterized by a high degree of safety, ease of manipulation and transportation, and facilitate great comfort and multiple position capability for the user when in position on a tree or pole.

Another object of this invention is to provide a new and improved portable climbing platform which can be quickly and easily transported to a desired hunting area and removably attached to a tree or pole and which is safe and easy to use in ascending and descending the tree or rotating or changing sitting position on the tree or pole.

A still further object of this invention is to provide a new and improved tree climbing platform which includes a pair of yokes arranged in spaced relationship on a tree or pole, with engaging bars or blades which may be removed from the yokes, positioned against the opposite side of the tree with a desired degree of slack, the blades removably secured to the yokes, respectively, typically by means of a bolt and wing nut combination.

Another object of this invention is to provide an efficient tree climbing platform having a cooperating foot support or foot climber, which foot support is characterized by a generally rectangular-shaped frame pivotally secured to a foot support yoke for supporting a hunter while the hunter ascends a tree or pole, with the yoke designed to securely engage the tree, or pole by means of a rear blade mounted to the yoke for cooperative engagement with the opposite side of the tree or pole to provide a safe and firm footing for varying the position of the climbing platform during ascent and descent of the tree or pole.

Another object of this invention is to provide a tree climbing platform and cooperating foot support which are each characterized by a yoke and cooperating blade for selective engagement with a tree trunk, in order to facilitate repetitive adjustment in the attitude and height of the two yokes to ascend and descend the tree.

Yet another object of this invention is to provide a climbing apparatus having a foot support which can be selectively folded and stored as desired, and which may be provided with straps for backpacking, in order to facilitate ease of transportation.

A further object of this invention is to provide a new and improved tree climbing platform and cooperating foot support which are both characterized by a tree-engaging yoke having a removable blade for engaging the tree on the opposite side thereof from the yoke, respectively, and the foot support further including a foot platform pivotally supported by the foot support yoke to support the weight of a user.

Another object of this invention is to provide a climbing platform apparatus and foot support which cooperate to facilitate multiple selected sitting and standing positions, both facing a tree or pole and facing away from the tree or pole, which apparatus provides a foot rest for the standing positions and a bicycle seat for the sitting positions.

SUMMARY OF THE INVENTION

These and other objects of the invention are provided in a tree climbing platform and cooperating foot support which include a platform yoke provided with a removable, adjustably mounted blade and a bicycle seat capable of being positioned in two locations; a foot support yoke also provided with a removable blade; and a foot platform pivoted to the foot support yoke for support while climbing a tree. The platform yoke and foot support yoke, along with the foot platform, are alternatively moved higher on the tree in inch-worm fashion, until the platform yoke is positioned at a selected height for hunting.

BRIEF DESCRIPTION OF THE DRAWINGS

The invention will be better understood by reference to the accompanying drawings, wherein:

FIG. 1 is a perspective view of the tree climbing platform and cooperating foot support in functional position on a tree;

FIGS. 2A–2D illustrate the relative climbing positions of the tree climbing platform and cooperating foot support as mounted on the tree;

FIG. 3 is a perspective view, partially in section, of the seat portion of the tree climbing platform, more particularly illustrating an alternative position for the seat;

FIG. 4 is a sectional view taken along line 4—4 in FIG. 3, more particularly illustrating preferred front and rear seat mounts;

FIG. 5 is an exploded view, partially in section, of the platform and foot support yoke elements of the tree climbing appartus, more particularly illustrating a preferred mounting of the platform blade and the foot support blade;

FIG. 6 is a sectional view taken along lines 6—6 in FIG. 1, more particularly illustrating a preferred mounting of the platform blade;

FIG. 7 is a top view of the platform yoke in functional position engaging a tree;

FIG. 8 is a perspective view of a preferred embodiment of the foot support in folded configuration; and FIG. 9 is sectional view taken along line 9—9 in FIG. 8, more particularly illustrating preferred pivoting attachment of the foot support yoke to the foot platform.

DESCRIPTION OF THE PREFERRED EMBODIMENTS

Referring initially to FIGS. 1, 3, and 4 of the drawings the tree climbing platform of this invention is generally illustrated by referenced numeral 1 and is situated in engagement with a tree 36. A foot support is generally illustrated by reference numeral 23 and is likewise situated in engagement with the tree 36 beneath the tree climbing platform 1. The tree climbing platform 1 includes a platform yoke 2, which is characterized by a pair of Y-segments 3 joining to define parallel support bars 7, spaced by a bifurcation 8. A front seat mount 10 and rear seat mount 11 are pivotally disposed in spaced relationship in the bifurcation 8 by means of mount pins 12, and are generally cylindrically shaped and provided with mount bores 15, as illustrated in FIG. 3, in order to receive the seat pedestal 14 of a seat 13. In a most preferred embodiment of the invention the seat 13 is a bicycle seat and the seat pedestal 14 fits in the mount bore 15 of either the front seat mount 10 or the rear seat mount 11 with a degree of tolerance which permits easy release of the seat 13. A mount stop 9 is attached to the extending ends of the support bars 7 and spans the bifurcation 8, in order to prevent the front seat mount 10 from pivoting forwardly significantly past the vertical position. Since both the front seat mount 10 and the rear seat mount 11 are pivoted in the bifurcation 8, they can each be recessed in the bifurcation 8 by 90° degree rotation, as illustrated by the arrows in FIG. 4. The Y-segments 3 are extended by parallel legs 5, fitted with adjusting holes 6 and are joined by a platform blade 17, having a top flange 18 and a bottom flange 19, which bottom flange 19 engages the tree 36. A pair of blade bolts 20 and cooperating wing nuts 16 (more particularly illustrated in FIGS. 5 and 6) serve to adjustably secure the bottom flange 19 of the platform blade 17 to the legs 5. The engaging edges 4 of the Y-segments 3 also engage the tree 36 at points opposite the bottom flange 19, in order to secure the tree climbing platform 1 in a selected position on the tree 36.

As further illustrated in FIGS. 1, 5 and 6, it will be appreciated that the blade bolts 20 can each be inserted through the flange holes 22 in the bottom flange 19 of the platform blade 17 and then be placed in registration with selected ones of the adjusting holes 6, to accommodate a tree 36 of selected size. It will be further appreciated that as pressure is applied downwardly on the support bars 7 or the seat 13 in the tree climbing platform 1, the engaging edges 4 of the Y-segments 3 and the bottom flange 19 of the platform blade 17 cut into the tree 36 to stabilize the tree climbing platform 1 in a selected position.

It will be further appreciated from a consideration of FIG. 1 that the foot support yoke 24 is similar in construction to the platform yoke 2, except for the absence of the front seat mount 10 and rear seat mount 11, since no seat 13 is necessary. A foot support blade 25 is mounted to the legs 5 of the foot support yoke 24, in the same manner as the platform blade 17 in the platform yoke 2. Accordingly, bolts 20, with cooperating wing nuts 16, serve to adjustably mount the bottom flange 19 of the foot support blade 25 to the legs 5 of the foot support yoke 24, in order to secure the foot support yoke 24 and the cooperating foot platform 26 in position on the tree 36 beneath the platform yoke 2. The foot platform 26 is further characterized by a generally rectangular shaped platform frame 27, having a pair of V bars 28 at the rear thereof and positioned in engagement with the tree 36 when in functional configuration. The V bars 28 are located beneath the Y-segments 3 in the foot support yoke 24 and serve to stabilize both the foot support yoke 24 and the foot platform 26 in position against the tree 36. The support bars 7 of the foot support yoke 24 are pivotally joined to the platform frame 27 by means of a support bar flange 30, and a cooperating support bar pin 31, which projects through the platform frame 27 and the support bar flange 30, as illustrated. The legs 5 are also joined to the platform frame 27 of the foot platform 26 by means of a pair of pivot bars 32, mounted in essentially parallel relationship and secured to the legs 5 and the frame 27, respectively, by means of pivot pins 33. A safety line 34 joins the platform yoke 2 to the foot support yoke 24, in order to prevent accidental slipping of the foot support 23 down the tree 36. In another preferred embodiment of the invention wire mesh 35 is provided on the platform frame 27, in order to provide a secure area for stepping by the hunter and foot straps 29 are also secured to the platform frame 27 to facilitate lifting of the foot support 23 during the climbing operation, as hereinafter described.

Referring now to FIGS. 6 and 7 of the drawings, in a most preferred embodiment of the invention and especially under circumstances where the tree climbing platform 1 and foot support 23 are to be used for climbing smooth wooden poles, the bottom flange 19 is fitted with a blade edge 21. The blade edge 21 is designed to bite into the outer surface of the pole, in order to insure that both the platform yoke 2 and the foot support yoke 24 do not slip when weight is applied by the hunter.

Referring to FIG. 8 of the drawings, it will be appreciated by those skilled in the art that the foot support 23 is capable of being folded to the illustrated position when not in use. Accordingly, when the foot support blade 25 is removed from the legs 5 and the legs 5 are removed from the tree 36, the foot support yoke 24 can be folded against the foot platform 26 by manipulation of the pivot bars 32 on the pivot pins 33, as illustrated.

In operation, and referring again to FIGS. 1 and 2A-2D of the drawings, the tree climbing platform 1 and cooperating foot support 23 are used as follows: the foot support blade 25 is first removed from the legs 5 of the foot support yoke 24 by removing the wing nuts 16 and cooperating blade bolts 20 and the legs 5 are extended to span the tree 36, as in FIG. 1. The foot support blade 25 is then replaced by inserting the blades bolts 20 through the flange holes 22 in the bottom flange 19 and then through appropriate ones of the oppositely disposed adjusting holes 6 in the legs 5, to loosely locate the foot support yoke 24 on the tree 36. The platform yoke 2 is similarly mounted in engagement with the tree 36 at a point above the foot support 22 by removing and then replacing the platform blade 17 in the same manner as described above. The seat 13 is then removed from either the front seat mount 10 or the rear seat mount 11 and the front seat mount 10 and rear seat mount 11 are rotated in the bifurcation 8 to a position in alignment with the support bars 7, while the tree climbing platform 1 and foot support 23 are in the climbing configuration. Alternatively, the seat 13 can be placed in the mount bore 15 of either the front seat mount 10 or the rear seat mount 11 and used to support the upper body of the hunter during the climbing operation. Initially, the hunter steps on the mesh 35 of the foot platform 26, places his feet in the foot straps 29 and then grasps the platform yoke 2 with both hands, while the platform yoke 2 and foot support 23 are in the position illustrated in FIG. 2A. The platform yoke 2 is then extended upwardly by the hands to a selected point on the tree 36, while the user's weight exerts a downward force on the foot platform 26, causing the bottom flange 19 of the foot support blade 25 and the Y-segments 3 of the foot support yoke 24 to tightly engage the tree, as indicated by the bottom arrow in FIG. 2B. Downward pressure is then applied to the support bars 7 and Y-segments 3 of the platform yoke 2, as illustrated by the arrows in FIG. 2C, in order to cause the bottom flange 19 of the platform blade 17 and the engaging edges 4 of the Y-segments 3 in the platform yoke 2, to cut into the tree. The foot platform 26 and foot support yoke 24 are then lifted by bringing the knees toward the chest, as illustrated by the bottom arrow, in FIG. 2C, after which, downward pressure is again applied to the foot platform 26 by the legs, as illustrated in FIG. 2D. The platform yoke 2 is then again lifted to a new position and the process is repeated until a desired height for locating the platform yoke 2 is reached.

A primary feature of the tree climbing platform 1 and the associated foot support 23 in the tree climbing apparatus of this invention is convenience, easy applicability to trees having a wide variety of sizes, and lightness of weight. The latter factor is particularly important under circumstances where the hunter must traverse a substantial area in order to reach an ideal hunting location. Accordingly, it will be appreciated that the foot support 23 can be folded into the configuration illustrated in FIG. 8 and strapped to the back of the hunter along with the platform yoke 2, in order to easily carry the device to substantially any location. Furthermore, the tree climbing platform 1 and foot support 23 are easily constructed and are simple and compact in design, the latter feature of which is particularly important in hunting, since the device is not easily seen at a relatively high elevation in a tree.

It will be appreciated that both the tree climbing platform 1 and the foot support 23 can be manufactured of such metals as steel and aluminum, with aluminum being a preferred material of construction due to lightness of weight. Furthermore, the Y-segments 3 can be welded or otherwise secured to the support bars 7 and the legs 5 according to design parameters which are well known to those skilled in the art. Furthermore, the points of attachments of the Y-segments 3 and the legs 5 can be squared off, as illustrated in FIGS. 1-4, or provided with a radius, as illustrated in FIGS. 5, 7 and 8. In another embodiment of the invention, each of the legs 5 can be shaped in one piece with the cooperating Y-segment 3, according to technology which is well known to those skilled in the art.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:
1. A tree climbing apparatus comprising:
 (a) a climbing platform characterized by a platform blade for transversely engaging a tree; a platform yoke having elongated seat support means at one end, a pair of platform Y-segments diverging in angular relationship from one end of said seat support means for engaging the tree at a point opposite said platform blade and a pair of platform legs extending in parallel relationship from said Y-segments, respectively, said platform legs spanning the tree and the extending ends of said platform legs removably connected to opposite ends of said platform blades; and (b) foot support means engaging the tree beneath said platform blade and said platform yoke for supporting a person.

2. The tree climbing platform of claim 1 wherein said seat support means further comprises a pair of support bars extending from said platform Y-segments in spaced, substantially parallel relationship to define a bifurcation and further comprising a seat in cooperation with said support bars.

3. The tree climbing platform of claim 1 wherein said platform blade further comprises a platform flange for engaging the tree, a pair of flange apertures in each end of said platform flange and connecting means in registration with said flange apertures and said extending ends of said platform legs for removably attaching said platform flange to said extending ends of said platform legs.

4. The tree climbing apparatus of claim 1 wherein:
(a) said seat support means further comprises a pair of support bars extending from said Y-segments in spaced, substantially parallel relationship to define a bifurcation and further comprising a seat in cooperation with said support bars; and
(b) said platform blade further comprises a platform flange for engaging the tree, a pair of flange apertures in each end of said platform flange and connecting means in registration with said flange apertures and said extending ends of said platform legs for removably attaching said platform flange to said extending ends of said platform legs.

5. The tree climbing apparatus of claim 4 further comprising at least one seat mount means provided in pivoted, spaced relationship in said bifurcation.

6. The tree climbing apparatus of claim 4 further comprising spaced leg apertures provided in said platform legs for selectively receiving said connecting means and mounting said platform flange of said platform blade on said platform legs.

7. The tree climbing apparatus of claim 4 further comprising:
(a) at least one seat mount means provided in pivoted, spaced relationship in said bifurcation and a pedestal extending from said seat for cooperation with said seat mount means; and
(b) spaced leg apertures provided in said platform legs for selectively receiving said connecting means and mounting said platform flange of said platform blade on said platform legs.

8. The tree climbing apparatus of claim 7 wherein said connecting means is a bolt and a cooperating wing nut for each of said flange apertures and said at least one seat mount means is a pair of seat mounts, each of said seat mounts having an internal bore therein for receiving said pedestal of said seat.

9. The tree climbing apparatus of claim 1 wherein said foot support means is further characterized by a foot support blade for transversely engaging the tree beneath said platform blade; a foot support yoke having a pivot end and a pair of foot support Y-segments extending in essentially parallel, spaced relationship from said pivot end spanning the tree, with the extending ends of said foot support Y-segments removably connected to said foot support blade; and a foot platform pivotally connected to said pivoting end and said foot support Y-segments, whereby said foot platform is deployed for engagement with the tree when said foot support yoke is in climbing configuration and said foot platform is folded with respect to said foot support yoke when said foot support yoke is in non-climbing configuration.

10. The tree climbing apparatus of claim 1 wherein:
(a) said seat support means further comprises a pair of support bars extending from said platform Y-segments in spaced, substantially parallel relationship to define a bifurcation and further comprising a seat in cooperation with said support bars;
(b) said platform blade further comprises a platform flange for engaging the tree, a pair of flange apertures in each end of said platform flange and connecting means in registration with said flange apertures and said extending ends of said platform legs for removably attaching said platform flange to said extending ends of said platform legs; and
(c) said foot support means is further characterized by a foot support blade for transversely engaging the tree beneath said platform blade; a foot support yoke having a pivot end and a pair of foot support Y-segments extending in essentially parallel, spaced relationship from said pivot end spanning the tree, with the extending ends of said foot support Y-segments removably connected to said foot support blade; and a foot platform pivotally connected to said pivot end and said foot support Y-segments, whereby said foot platform is deployed for engagement with the tree when said foot support yoke is in climbing configuration and said foot platform is folded with respect to said foot support yoke when said foot support yoke is in non-climbing configuration.

11. The tree climbing apparatus of claim 10 further comprising:
(a) at least one seat mount means provided in pivoted, spaced relationship in said bifurcation and a pedestal extending from said seat for cooperation with said seat mount means; and
(b) spaced leg apertures provided in said platform legs for selectively receiving said connecting means and mounting said platform flange of said platform blade on said legs.

12. The tree climbing apparatus of claim 11 wherein said connecting means is a bolt and a cooperating wing nut for each of said flange apertures and said at least one seat mount means is a pair of seat mounts, each of said seat mounts having an internal bore therein for receiving said pedestal of said seat.

13. A climbing apparatus for ascending a tree or the like, comprising:
(a) a platform yoke characterized by a first pair of Y-segments extending from a first common point of attachment and engaging a tree and a first pair of arms carried by said first pair of Y-segments in spaced relationship for spanning the tree; a seat support extending from said first common point of attachment opposite said first pair of Y-segments and a first blade removably and adjustably connecting the extending ends of said first pair of arms, said first blade engaging the tree opposite said first pair of Y-segments;

(b) a foot support yoke characterized by a second pair of Y-segments extending from a second common point of attachment and engaging a tree and a second set of arms carried by said second pair of Y-segments in spaced relationship for spanning the tree; a pivot end extending from said second common point of attachment opposite said Y-segments; and a second blade removably and adjustably connecting the extending ends of said second pair of arms, said second blade engaging the tree opposite said second pair of Y-segments; and (c) a foot platform pivotally attached to said pivot end of said foot support yoke and further comprising a pair of pivot bars extending between points of pivot on said second pair of Y-segments and said foot platform, respectively, whereby said foot platform is deployed for engagement with the tree when said foot support yoke is in climbing configuration and said foot platform is folded with respect to said foot support yoke when said foot support yoke is in non-climbing configuration.

14. The climbing apparatus of claim 13 wherein said seat support means further comprises a pair of support bars extending from said platform Y-segments in spaced, substantially parallel relationship to define a bifurcation and further comprising a seat in cooperation with said support bars.

15. The climbing apparatus of claim 13 wherein said platform blade further comprises a platform flange for engaging the tree, a pair of flange apertures in each end of said platform flange and connecting means in registration with said flange apertures and said extending ends of said platform legs for removably attaching said platform flange to said extending ends of said platform legs.

16. The climbing apparatus of claim 13 wherein:
(a) said seat support means further comprises a pair of support bars extending from said platform Y-segments in spaced, substantially parallel relationship to define a bifurcation and further comprising a seat in cooperation with said support bars; and
(b) said platform blade further comprises a platform flange for engaging the tree, a pair of flange apertures in each end of said platform flange and connecting means in registration with said flange apertures and said extending ends of said platform legs for removably attaching said platform flange to said extending ends of said platform legs.

17. The tree climbing apparatus of claim 16 further comprising at least one seat mount means provided in pivoted, spaced relationship in said bifurcation.

18. The tree climbing apparatus of claim 16 further comprising spaced leg apertures provided in said platform legs for selectively receiving said connecting means and mounting said platform flange of said platform blade on said platform legs.

19. The tree climbing apparatus of claim 16 further comprising:
(a) at least one seat mount means provided in pivoted, spaced relationship in said bifurcation; and
(b) spaced leg apertures provided in said platform legs for selectively receiving said connecting means and mounting said platform flange of said platform blade on said platform legs.

20. The tree climbing apparatus of claim 19 wherein said connecting means is a bolt and a cooperating wing nut for each of said flange apertures and said at least one seat mount means is a pair of seat mounts, each of said seat mounts having an internal bore therein for receiving said pedestal of said seat.

* * * * *